US011928556B2

(12) United States Patent
Hadash et al.

(10) Patent No.: US 11,928,556 B2
(45) Date of Patent: Mar. 12, 2024

(54) REMOVING UNNECESSARY HISTORY FROM REINFORCEMENT LEARNING STATE

(71) Applicant: International Business Machines Corporation, Armonk, NY (US)

(72) Inventors: Guy Hadash, Haifa (IL); Boaz Carmeli, Koranit (IL); George Kour, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 523 days.

(21) Appl. No.: 16/236,402

(22) Filed: Dec. 29, 2018

(65) Prior Publication Data

US 2020/0210884 A1 Jul. 2, 2020

(51) Int. Cl.
*G06N 20/00* (2019.01)
(52) U.S. Cl.
CPC .................... *G06N 20/00* (2019.01)
(58) Field of Classification Search
CPC .................................................. G06N 20/00
See application file for complete search history.

(56) References Cited

U.S. PATENT DOCUMENTS

| 8,326,780 | B2 | 12/2012 | Gupta et al. | |
| 9,165,249 | B2* | 10/2015 | Kobayashi | G06N 3/126 |
| 9,536,191 | B1* | 1/2017 | Arel | G06N 3/0454 |
| 9,679,258 | B2* | 6/2017 | Mnih | G06N 20/00 |
| 2015/0100530 | A1 | 4/2015 | Mnih et al. | |
| 2019/0272465 | A1* | 9/2019 | Kimura | G06N 3/0481 |
| 2020/0285939 | A1* | 9/2020 | Baker | G06N 7/01 |

FOREIGN PATENT DOCUMENTS

| CN | 107241213 A | 10/2017 |
| JP | 4811997 B2 * | 11/2011 |

OTHER PUBLICATIONS

Deep Reinforcement Learning with LSTM-based Exploration Bonus (Jinho) taken from https://s-space.snu.ac.kr/bitstream/10371/122687/1/000000140903.pdf (Year: 2017).*
10 Stochastic Gradient Descent Optimisation Algorithms + Cheat Sheet (Karim, taken from https://towardsdatascience.com/10-gradient-descent-optimisation-algorithms-86989510b5e9 (Year: 2018).*
Exploration-Exploitation Trade-off in Deep Reinforcement Learning (Rusch) taken from https://www.semanticscholar.org/paper/Exploration-Exploitation-Trade-off-in-Deep-Learning-Rusch/77a31a4601444a3f7aeed15061b08684d0bea92b (Year: 2018).*

(Continued)

*Primary Examiner* — Alexey Shmatov
*Assistant Examiner* — Clint Mullinax
(74) *Attorney, Agent, or Firm* — Daniel Morris; Otterstedt & Kammer PLLC (57) ABSTRACT

Methods and systems for a reinforcement learning system. A spatial and temporal representation of an observed state of an environment is encoded. A previous state is estimated from a given state and a size of a reward is adjusted based on a difference between the estimated previous state and the previous state.

20 Claims, 5 Drawing Sheets

(56) References Cited

OTHER PUBLICATIONS

Peng et al, "Jointly optimize data augmentation and network training: Adversarial data augmentation in human pose estimation", 2018, Proceedings of the IEEE Conference on Computer Vision and Pattern Recognition (CVPR), 2018, pp. 2226-2234. (Year: 2018).*

RLBS: An Adaptive Backtracking Strategy Based on Reinforcement Learning for Combinatorial Optimization (Bachiri) taken from https://ieeexplore.ieee.org/document/7372232 (Year: 2015).*

Recall Traces: Backtracking Models for Efficient Reinforcement Learning (Anirudh Goyal 1 Philemon Brakel 2 William Fedus 1 Timothy Lillicrap 2 Sergey Levine 3 Hugo Larochelle 4 Yoshua Bengio) taken from https://arxiv.org/pdf/1804.00379v1.pdf (Year: 2018).*

Curran, William, et al. "Using PCA to efficiently represent state spaces." arXiv preprint arXiv:1505.00322 (2015), 8 pages.

Curran, William, et al. "Dimensionality reduced reinforcement learning for assistive robots." Proc. of Artificial Intelligence for Human-Robot Interaction at AAAI Fall Symposium Series. 2016, 7 pages.

Pathak, Deepak, et al. "Curiosity-driven exploration by self-supervised prediction." International Conference on Machine Learning (ICML). vol. 2017. 2017 pp. 1-12.

Peter Mell and Timothy Grance, The NIST Definition of Cloud Computing, NIST Special Publication 800-145, Sep. 2011, cover, pp. i-iii, pp. 1-3.

Bellemare, Marc G., et al. "The arcade learning environment: An evaluation platform for general agents." Journal of Artificial Intelligence Research 47 (2013): 253-279.

Mnih, Volodymyr, et al. "Human-level control through deep reinforcement learning." Nature 518.7540 (2015): 529-533 (Abstract only pp. 1-9).

Zhu P, Li X, Poupart P, Miao G. On improving deep reinforcement learning for pomdps. arXiv preprint arXiv:1804.06309. Apr. 17, 2018 (Abstract only pp. 1-3).

Hausknecht, Matthew, and Peter Stone. "Deep recurrent q-learning for partially observable mdps." CoRR, abs/1507.06527 7.1 (2015), pp. 1-9.

Mnih, Volodymyr, et al. "Human-level control through deep reinforcement learning." Nature 518.7540 (2015): 529-533 Full paper.

Zhu P, Li X, Poupart P, Miao G. On improving deep reinforcement learning for pomdps. arXiv preprint arXiv:1804.06309. Apr. 17, 2018 Full Paper pp. 1-7.

Shelhamer E, Mahmoudieh P, Argus M, Darrell T. Loss is its own reward: Self-supervision for reinforcement learning. arXiv preprint arXiv:1612.07307v2. Mar. 9, 2017 pp. 1-9.

* cited by examiner

REMOVING UNNECESSARY HISTORY FROM REINFORCEMENT LEARNING STATE

BACKGROUND

The present invention relates to the electrical, electronic and computer arts, and more specifically, to reinforcement learning (RL) systems.

Reinforcement learning is commonly used for solving Markov-decision processes (MDP), where an agent interacts with the world and collects rewards. The theory of RL is based on the Markovian property. Namely, the decision-making process should be based solely on the current state and independent of previous states. This requires that the representation of the current state contains all the information needed to decide on an action. When designing the MDP for a real world problem, however, it is not always clear how the history of the agent interaction with the environment should affect the agent decision. Modelers therefore tend to integrate all or part of the agent's recent history into the state. This approach may result in a very large vector as part of an inefficient state representation, which in turn may slow down the learning process and inhibit generalization due to the well known phenomenon associated with analyzing high-dimensional spaces. It would also impact the sample inefficiency issues well known in RL.

Consider the building of an agent that plays the game "Ping Pong." At each moment, the agent should learn how to place the paddle to avoid missing the ball. Assume that the agent receives a single image of the current location of the ball. The agent will not be able to determine the direction to move the paddle because it cannot predict the future placement of the ball. This is because a single image does not reveal the direction and velocity of the ball. However, if the agent is given several subsequent images, it will be able to to estimate the direction of the ball. If the snapshots are taken at constant time intervals, the agent will also be able to estimate the velocity of the ball. Given this information, an intelligent agent would be able to direct the paddle in the correct direction and location. Determining from the consequent image that the ball location and velocity are important aspects that should be calculated in order to best place the paddle, however, is not an easy task.

SUMMARY

Principles of the invention provide techniques for removing unnecessary history from a reinforcement learning state. In one aspect, an exemplary method includes the step of encoding a spatial and temporal representation of an observed state of an environment; estimating a previous state from a given state; and adjusting a size of a reward based on a difference between the estimated previous state and the previous state.

In one aspect, an exemplary reinforcement learning system comprises a state encoder for encoding a spatial and temporal representation of an observed state of an environment; a previous state estimator (PSE) for estimating a previous state from a given state; an accuracy evaluator for determining a difference between the estimated previous state and the previous state; and a reward modifier for adjusting a size of a reward based on the difference between the estimated previous state and the previous state.

In one aspect, an exemplary non-transitory computer readable medium comprises computer executable instructions which when executed by a computer cause the computer to perform operations comprising encoding a spatial and temporal representation of an observed state of an environment; estimating a previous state from a given state; and adjusting a size of a reward based on a difference between the estimated previous state and the previous state.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

providing an efficient state representation of a Markov-decision process;

improving the performance of training and operating a reinforcement learning system;

more efficient feature extraction requiring fewer processor cycles;

enabling generalization in the reinforcement learning system; and mitigating the sample inefficiency problem in RL.

These and other features and advantages of the present invention will become apparent from the following detailed description of illustrative embodiments thereof, which is to be read in connection with the accompanying drawings.

BRIEF DESCRIPTION OF THE DRAWINGS

FIG. 5 depicts a computer system that may be useful in implementing one or more aspects and/or elements of the

DETAILED DESCRIPTION

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
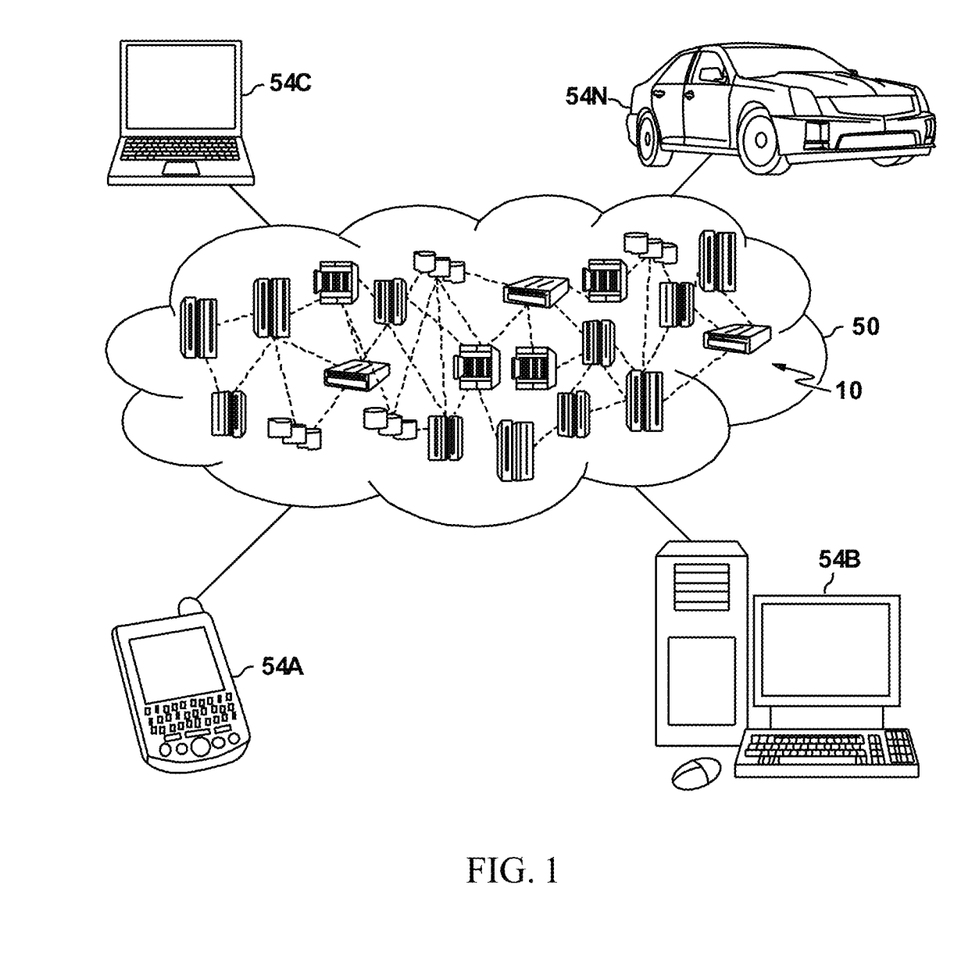
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
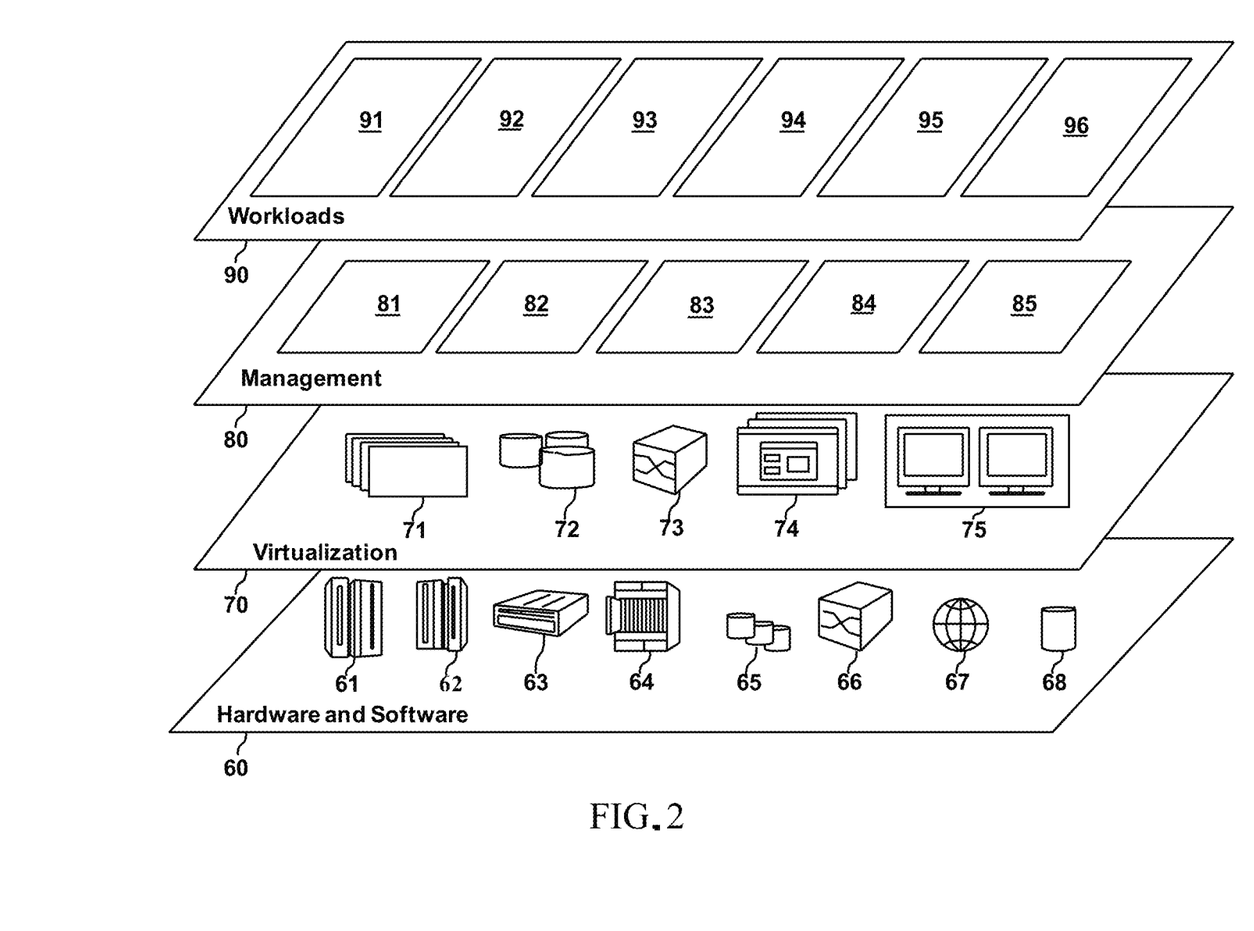
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and reinforcement learning 96.

The continuous extraction of temporal patterns and comparison to expectations is a fundamental skill needed by individuals to facilitate adaptive behavior and optimal functionality in their environment. In many dynamic environments, the information available at a single moment in time is not sufficient to make a good decision; however, varying information over time can be. This is due to our capacity for temporal integration of observations which, in the RL framework, is achieved by efficiently encoding (in the current state) important historical events or dynamics extracted from past observations. Building such a representation, however, is not trivial, especially since, in different tasks, different past events and dynamics are relevant.

Generally, a method for learning temporal encoding is disclosed. The inner state is improved by adding another auxiliary loss in the determination of a reward which encourages an agent to remove history information from the state if it is not relevant for future decisions. In one example embodiment, a predictor (a previous state estimator) component is added to the network which attempts to predict information from the previous state given the current state. This information can be the state itself, the chosen action, or any other information. While the predictor is trained to improve its abilities to predict information associated with the previous state, the state encoder is also trained to attempt to fool the discriminator (the predictor), such as by flipping the gradients at the entry point to the predictor. Then, due to the principal task of the state encoder to encode the relevant information for future actions into the state, the encoder will attempt to learn an encoding which will contain only information which is relevant for a future decision and not, for example, for previous decisions.

Herein, "observation" is generally employed to refer to the raw state received by the environment and the word "state" is employed for observations after encoding. Namely, $h_t$ is the state and $o_t$ is the observation.

Denoting $o_t$ to be the observation retrieved from the environment at time t and E( ) as the state encoder:

$$h_n = E(o_t)$$

P( ) is introduced as the predictor whose function is to predict $h_{n-1}$ from $h_n$:

$$P(h_n) \approx h_{n-1}$$

P is trained to predict $h_{n-1}$ (or any other information from the previous state) using backpropagation. In the same time, E( ) is trained to attempt to fool P( ) by flipping the gradients at the entry point to P( ), which is done by multiplying the gradients by −1. In the first round, P is not trained since there is no previous step.

While the Markov property ensures that the state contains all the information to make a decision, in many real life scenarios, the current observed state of the environment is not enough and information observed in the past is needed to decide on the next action. Even in a simple Atari® 2600 console (manufactured by Atari, Inc. of Sunnyvale, CA), in most of the games, a single game screen gives only partial information about the current state of the environment. One example is the game of "Pong" in which the current screen only reveals the location of the ball, but not its direction or velocity, which is crucial for the player to determine where to place the paddle. (It is noted that, with the development of reinforcement learning in the domain of deep neural networks, emulators of the Atari® environment developed in Bellemare et al. (Bellemare, Marc G., et al. "The arcade learning environment: An evaluation platform for general agents." *Journal of Artificial Intelligence Research* 47 (2013): 253-279.) became the de-facto standard benchmark for testing and demonstrating reinforcement learning abilities of algorithms.)

In partially observed Markov Decision Models (POMDPs), the entire state of the environment is not observed by the agent. For instance, if the agent has only a light sensor and the environment contains different odors in the different states, then the environment state is partially observable. Alternatively, the partial observability may be manifested in the sense that only a small portion of the environment is observable. For example, the agent can see only the near surrounding environment and not the entire space. In other cases, taking only the last snapshot view of the environment may not be sufficient to make action decisions due to the fact that there are dynamic aspects that cannot be expressed by a static image, such as the direction and velocity of an object. In all of the above manifestations of partial observability, the recent history is an important part of the state description.

The state of an Atari® 2600 game is fully described by the 128 bytes of console RAM. Humans and agents, however, observe only the console-generated game screens. For many games, a single game screen is insufficient to determine the state of the system. Deep Q-network (DQN) infers the full state of an Atari® game by expanding the state representation to encompass the last four game screens. Many games that were previously POMDPs now become MDPs. Of the 49 games investigated by Mnih et al. (Mnih, Volodymyr, et al. "Human-level control through deep reinforcement learning." *Nature* 518.7540 (2015): 529.), Zhu et al. (Zhu P, Li X, Poupart P, Miao G. On improving deep reinforcement learning for POMDPs. arXiv preprint arXiv:1804.06309. 2018 Apr. 17.) were unable to identify any that were partially observable given the last four frames of input. Since the explored games are fully observable given four input frames, a method to introduce partial observability without reducing the number of input frames given to DQN is useful.

One commonly used approach to overcome this problem is to use a function that encodes the current and some historical observations of the environment into a state that is used by, for example, an agent. This function, in most cases, is simply a concatenation of the recently observed states. This approach was followed by Mnih et. al (Volodymyr Mnih, Koray Kavukcuoglu, David Silver, Andrei A Rusu, Joel Veness, Marc G Bellemare, Alex Graves, Martin Riedmiller, Andreas K Fidjeland, Georg Ostrovski, et al. Human-level control through deep reinforcement learning. Nature, 518(7540):529, 2015). They stacked the last four processed images to produce the state provided to the policy network. Nevertheless, the myriad low level features of the current and historical observed states may inhibit learning, and it is useful not only to represent the state in higher level features but also to make sure that only the relevant parts of the history are maintained.

For an agent to learn to behave efficiently in a dynamic, partially observed environment, it should learn to encode the state not only by the current observation, but also by the relevant aspects of previous observations. Learning such an efficient representation from sparse feedback can be a major challenge. All the more so since the temporal aspects that are important differ in different tasks. In the same sense that neural networks are used to learn a high level representation containing descriptive features to allow fast learning in the spatial domain, a general method for learning high level representation of the history in the temporal domain is disclosed.

Notations and Definitions

Figure 3:
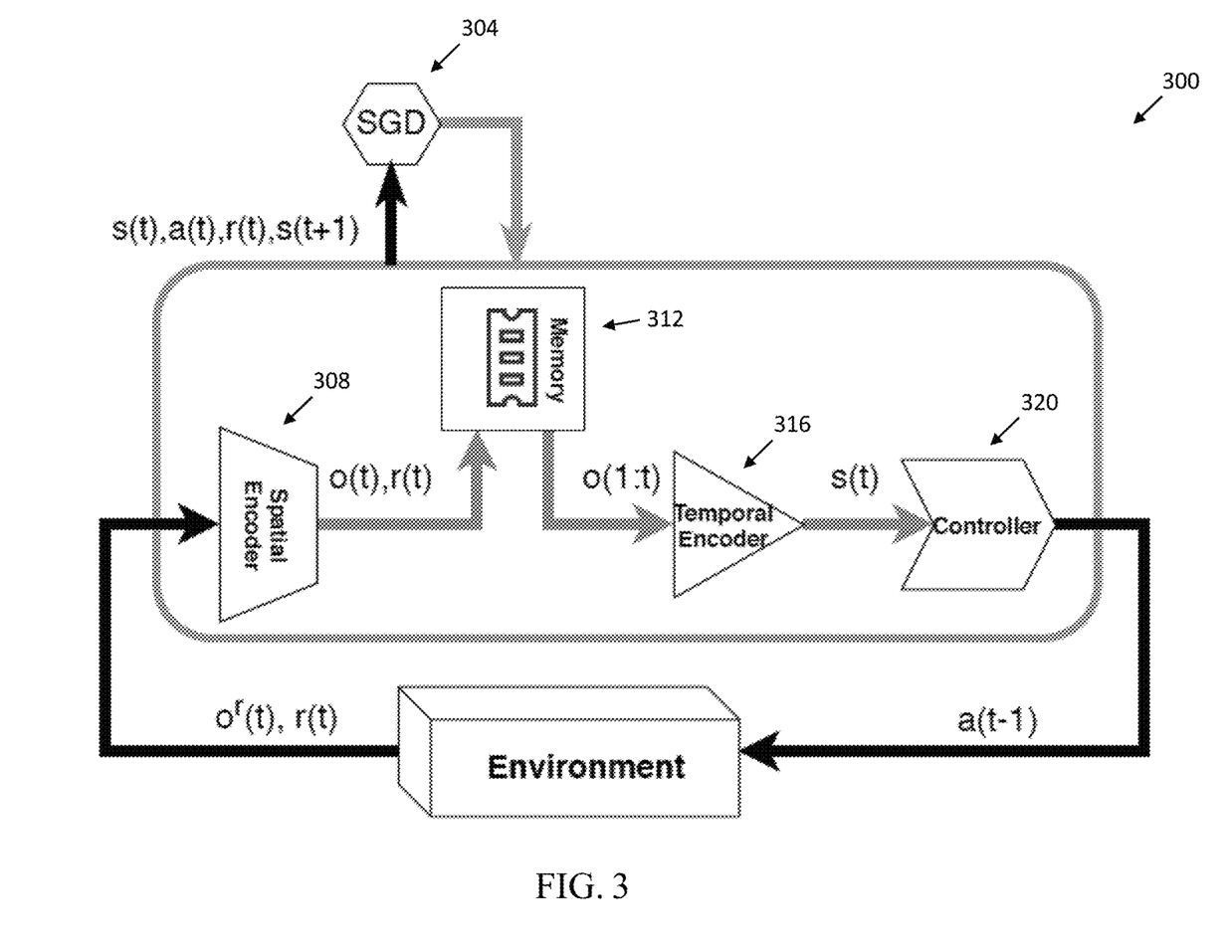
FIG. 3 is a block diagram of an example temporal reinforcement learning model, in accordance with an example embodiment.

FIG. 3 is a block diagram of an example temporal reinforcement learning model 300, in accordance with an example embodiment. In FIG. 3, solid arrows represent interaction of the agent with the environment and dashed arrows represent information flow within the model. A spatial encoder 308 encodes spatial information of the observed state and stores the encoded representation in memory 312. A temporal encoder 316 encodes temporal information from previous states based on the encoded representation in memory 312. In one example embodiment, a spatial and temporal representation (encoding) is created at the same time by a state encoder. In one example embodiment, the state encoder comprises the spatial encoder 308 and the temporal encoder 316. A stochastic gradient descent (SGD) component 304 trains the neural network (changing, for example, the weights of the neurons); note, while SGD is a common optimization function used to train neural networks, other optimization algorithms can be used in other embodiments (e.g., gradient based). In addition to neural networks, linear and polynomial models may also be utilized. A controller 312 then decides on an action at based on the spatially and temporarily encoded state representation (the spatial and temporal features indicated by $s_t$).

Denote the observed state at time t as $o_t^r$. (The upperscript r indicates that this is the raw observation.) Denote the function that extracts the important spatial information into an efficient, high-level representation given parameter θ by $\psi_\theta$:

$$o_t = \psi_\theta(o_t^r)$$

Namely, $\psi_\theta$ is the function (provided by the spatial encoder 308) that encodes the current observation regardless of the previous observations. The learned function $\Omega_\theta$ (provided by the temporal encoder 316) will represent the temporal encoding procedure that takes into account the current and previous encoded states, and extracts the temporally-important aspects that are used to efficiently behave in the environment. (Note that the number of observations is selectable and does not necessarily include all of the available observations. For example, a total of four observations may be used to determine the temporally-important aspects.)

$$s_t = \Omega_\theta(o_{1:t})$$

This is usually done using a recurrent neural network (RNN) component. (See, for example, Matthew Hausknecht and Peter Stone. Deep recurrent q-learning for partially observable mdps. CoRR, abs/1507.06527, 7(1), 2015.)

Figure 4:
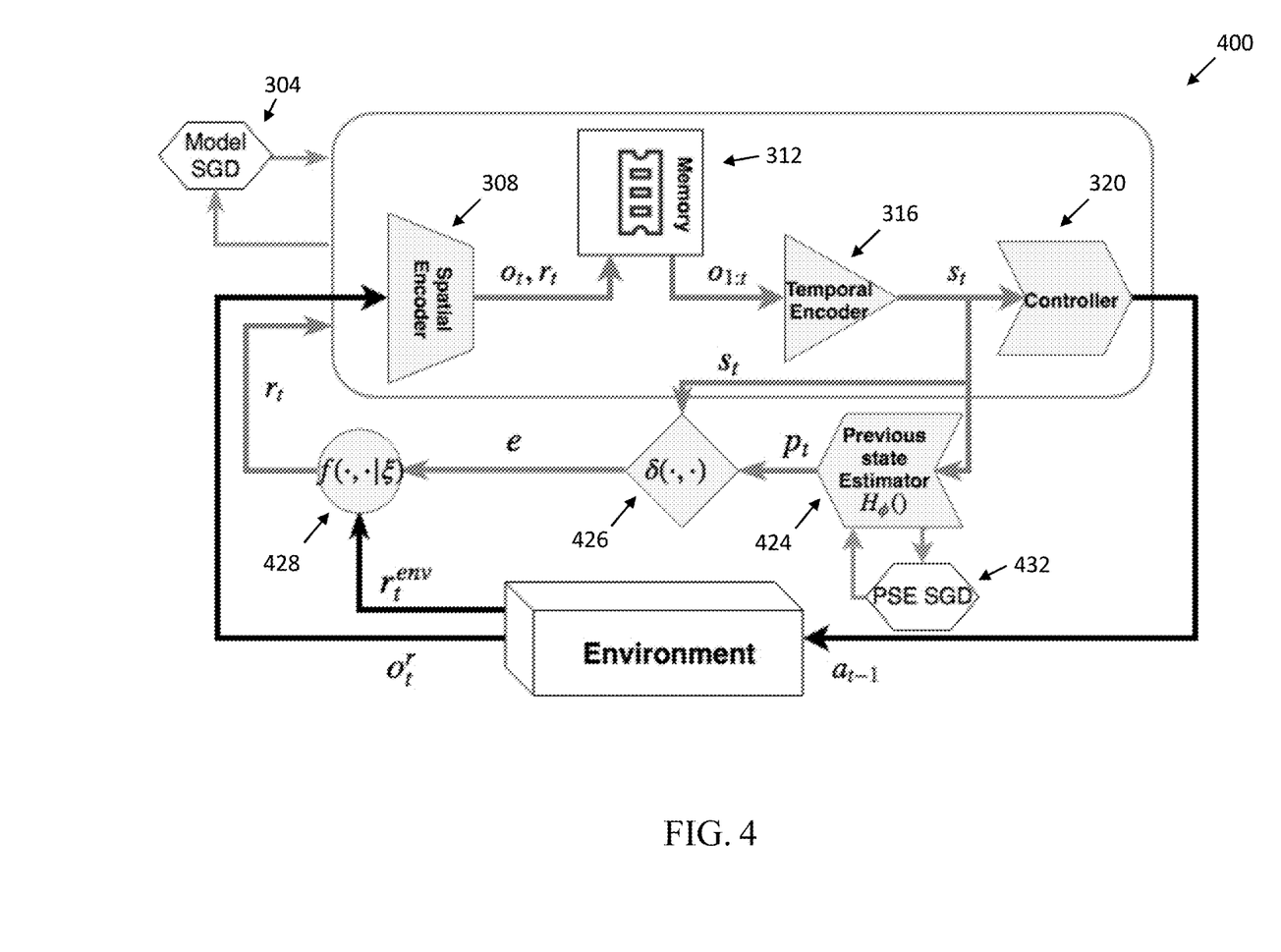
FIG. 4 is a block diagram of an example temporal reinforcement learning model incorporating a previous state estimator, in accordance with an example embodiment.

FIG. 4 is a block diagram of an example temporal reinforcement learning model 400 incorporating a previous state estimator (PSE), in accordance with an example embodiment. The components of temporal reinforcement learning model 400 are similar to the components of temporal reinforcement learning model 300, except for the addition of a predictor in the form of a previous state estimator 424, an accuracy evaluator 426, a reward modifier 428, and a PSE stochastic gradient descent component 432 (generally representative of a suitable optimizer). The previous state estimator 424 implements a model (denoted by $H_\phi$ below) that attempts to learn a mapping between the current and previous states; that is, given the current state $s_t$, the previous state estimator 424 attempts to compute a previous state, such as $s_{t-1}$. The mapping may be learned by considering a plurality of historical states. For example, the previous state estimator 424 may consider pairs of previous states, such as $s_{t-1}$ and $s_{t-2}$; $s_{t-2}$ and $s_{t-3}$; and so on. If the previous state estimator 424 is able to accurately predict a previous state given the current state, it is an indication that the spatial and temporal state representation contains more information than is necessary and that it is therefore a less efficient state representation than is possible. The previous state estimator 424 is trained by the PSE stochastic gradient descent component 432 which uses a gradient based optimization algorithm.

Note that the partition to spatial and temporal encoding 308, 316 is exemplary and non-limiting and is used for illustrative purposes—other embodiments need not necessarily have such a partition.

The accuracy evaluator 426 implements a function, denoted as δ, that calculates the accuracy of the prediction, where the accuracy is denoted by e (from the word error). The value e can be calculated using any differential loss function (denoted below as δ). The previous state estimator 424 is optimized to minimize the value e using gradient based optimization techniques. The accuracy of the prediction $e = \delta(s_{t-1}, H_\phi(s_t))$ combined with the reward of the environment $r_t^{env}$ is used by the reward modifier 428 to calculate the reward signal given to the agent. The reward modifier 428 implements a function, denoted as $f$, to calculate the reward signal given to the agent based on the accuracy of the prediction e and the reward of the environment $r_t^{env}$. In general, an inaccurate prediction (indicating an efficient state representation) generates a higher reward for the agent than an accurate prediction (indicating an inefficient state representation). Thus, the model will learn to generate a more efficient state representation while also learning to improve the decision-making process. By way of summary, in one or more embodiments, the accuracy is calculated by the function $\delta$ (block 426) while the role of function $f$ block 428 is to determine the effect of the accuracy on the reward.

In FIG. 4, solid arrows represent interaction of the agent with the environment and dashed arrows represent information flow within the model. It is noted that a state representation $s_t$ is (temporally) efficient if it does not incorporate unnecessary information about a previous state $s_{t-1}$. To measure the amount of information stored in the representation $s_t$ about previous states, a function that is trained to estimate the previous state $s_{t-1}$ given the current state $s_t$ is fitted:

$$H_\phi(s_t) = p_t \to s_{t-1}$$

Note that, while the output of the model $H_\phi$ produced by the previous state estimator 424 is denoted by $p_t$ and is a prediction/estimate of the previous state $s_{t-1}$, the goal of using the model $H_\phi$ is to accurately predict $s_{t-1}$. The accuracy of $H_\phi$ is propagated to the reward function as follows:

$$r_t = r_t^{env} - \xi \delta(s_{t-1}, H_\phi(s_t))$$

where $r_t^{env}$ represents the rewards given by the environment at time t, $\delta$ is a general distance function between two state representations, and $\xi$ is a predefined weight. Thus, the reward from the environment $r_t^{env}$ is reduced by an amount that is based on the error in the accuracy of the prediction by the previous state estimator 424. In one example embodiment, $\xi$ is adjusted (changed and tuned, optionally as a function of time) based on a heuristic to determine the effect of $\xi$ on the reward. For example, at the beginning of the learning, a larger $\xi$ is utilized and is reduced over time as the learning progresses (similar to an epsilon annealing schedule; thus, one approach is an "annealing schedule"). Given the teachings herein, the skilled artisan will be able to select appropriate values for $\xi$. For example, $\xi$ may start with a value of 0.1 and be reduced to a value of 0.

In one or more embodiments, certain parameters are determined by the user, including, for example, $\xi$, the model $H_\phi(s_t)$, $\delta$ and $f(\cdot,\cdot)$. These parameters depend on the specific task and the specific implementation of the model. For instance, H could be implemented as a neural network, $\delta$ could be the Euclidian distance, and f could be the following:

$$r_t = r_t^{env} - \xi \delta(s_{t-1}, H_\phi(s_t))$$

Given the teachings herein, the skilled artisan will be able to select appropriate values for the parameters, depending on the task and model implementation.

Given the discussion thus far, it will be appreciated that, in general terms, an exemplary method, according to an aspect of the invention, includes the step of encoding a spatial and temporal representation of an observed state of an environment; estimating a previous state from a given state; and adjusting a size of a reward based on a difference between the estimated previous state and the previous state.

According to an aspect of the invention, a reinforcement learning system 400 comprises: a state encoder 308, 316 for encoding a spatial and temporal representation of an observed state of an environment; a previous state estimator 424 for estimating a previous state from a given state; an accuracy evaluator 426 for determining a difference between the estimated previous state and the previous state; and a reward modifier 428 for adjusting a size of a reward based on the difference between the estimated previous state and the previous state. One non-limiting example for the state encoder is a convolutional neural network. One non-limiting example for the temporal encoder is a Long Short term Memory (LSTM) component.

According to an aspect of the invention, non-transitory computer readable medium comprises computer executable instructions which when executed by a computer cause the computer to perform operations comprising encoding a spatial and temporal representation of an observed state of an environment; estimating a previous state from a given state; and adjusting a size of a reward based on a difference between the estimated previous state and the previous state.

In one example embodiment, the state encoder 308, 316 is reconfigured based on the adjusted reward to reduce an effective size of the spatial and temporal representation. In one example embodiment, the state encoder 308, 316 is trained to multiply gradients by minus one to generate input to the previous state estimator 424. In one example embodiment, the size of the reward is adjusted based on $$r_t = r_t^{env} - \xi \delta(s_{t-1}, H_\phi(s_t))$$

where $r_t^{env}$ represents a reward given by an environment at time t, $s_t$ is a state of the environment at the time t, $H_\phi$ is a function that is trained to estimate the previous state from the given state, $\delta$ is a general distance function between two state representations, and $\xi$ is a predefined weight.

In one example embodiment, the operations further comprise determining an action based on the spatial and temporal representation. In one example embodiment, the operations further comprise training a model defining the state encoder 308, 316 using a gradient based optimization algorithm 304. In one example embodiment, the operations further comprise training the previous state estimator 424 using a gradient based optimization algorithm 432.

Figure 5:
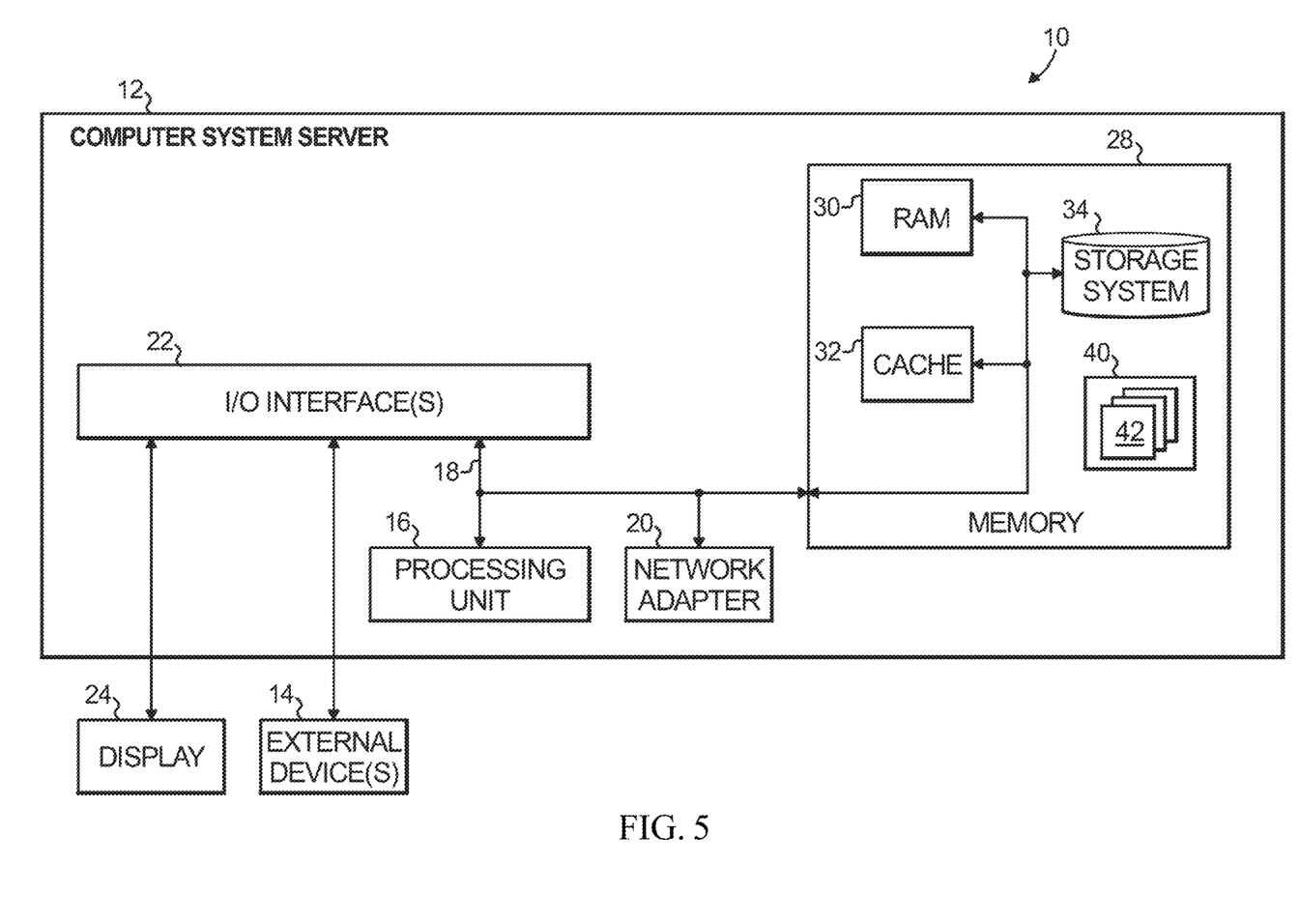

One or more embodiments of the invention, or elements thereof, can be implemented in the form of an apparatus including a memory and at least one processor that is coupled to the memory and operative to perform exemplary method steps. FIG. 5 depicts a computer system that may be useful in implementing one or more aspects and/or elements of the invention, also representative of a cloud computing node according to an embodiment of the present invention. Referring now to FIG. 5, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 5, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks.

Modems, cable modem and Ethernet cards are just a few of the currently available types of network adapters.

As used herein, including the claims, a "server" includes a physical data processing system (for example, system 12 as shown in FIG. 5) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A reinforcement learning system comprising:
    a state encoder for encoding a spatial and temporal representation of an observed state of an environment;
    a previous state estimator (PSE) for generating an estimated previous state that estimates a previous state of a given state;
    an accuracy evaluator for determining a difference between the estimated previous state and the previous state; and
    a reward modifier for adjusting a size of a reward based on the difference between the estimated previous state and the previous state, wherein an inaccurate estimation by the previous state estimator (PSE) is an efficient state representation and generates a higher reward than an accurate estimation, wherein the accurate estimation is an inefficient state representation by the previous state estimator (PSE), wherein the inefficient state representation incorporates more information than is necessary for determining an action to be performed.

2. The reinforcement learning system of claim 1, wherein the state encoder is reconfigured based on the adjusted reward to reduce an effective size of the spatial and temporal representation.

3. The reinforcement learning system of claim 1, further comprising a controller for determining the action based on the spatial and temporal representation.

4. The reinforcement learning system of claim 1, further comprising a model stochastic gradient descent component for training a model defining the state encoder, the first stochastic gradient descent component using a gradient based optimization algorithm.

5. The reinforcement learning system of claim 1, further comprising a previous state estimator stochastic gradient descent component for training the previous state estimator (PSE), the previous state estimator stochastic gradient descent component using a gradient based optimization algorithm.

6. The reinforcement learning system of claim 1, wherein the state encoder is trained to multiply gradients by minus one to generate input to the previous state estimator.

7. A reinforcement learning system comprising:
    a state encoder for encoding a spatial and temporal representation of an observed state of an environment;
    a previous state estimator (PSE) for generating an estimated previous state that estimates a previous state of a given state;
    an accuracy evaluator for determining a difference between the estimated previous state and the previous state; and
    a reward modifier for adjusting a size of a reward based on the difference between the estimated previous state and the previous state, wherein an inaccurate estimation by the previous state estimator (PSE) is an efficient state representation and generates a higher reward than an accurate estimation, wherein the accurate estimation is an inefficient state representation by the previous state estimator (PSE), wherein the reward modifier adjusts the size of the reward based on $$r_t = r_t^{env} - \xi \delta(s_{t-1}, H_\phi(s_t))$$

where $rt^{env}$ represents a reward given by an environment at time t, $s_t$ is a state of the environment at the time t, $H\phi$ is a function that is trained to estimate the previous state from the given state, $\delta$ is a general distance function between two state representations, and $\xi$ is a predefined weight, wherein the inefficient state representation incorporates more information than is necessary for determining an action to be performed.

8. A method comprising:
    encoding a spatial and temporal representation of an observed state of an environment;
    generating an estimated previous state that estimates a previous state of a given state; and
    adjusting a size of a reward based on a difference between the estimated previous state and the previous state, wherein an inaccurate estimation of the previous state is an efficient state representation and generates a higher reward than an accurate estimation, wherein the accurate estimation is an inefficient state representation of the previous state, wherein the inefficient state representation incorporates more information than is necessary for determining an action to be performed.

9. The method of claim 8, further comprising reconfiguring a state encoder based on the adjusted reward to reduce an effective size of the spatial and temporal representation.

10. The method of claim 8, further comprising determining the action based on the spatial and temporal representation.

11. The method of claim 8, further comprising training a model defining a state encoder using a gradient based optimization algorithm.

12. The method of claim 8, further comprising training a previous state estimator using a gradient based optimization algorithm.

13. The method of claim 8, wherein a state encoder is trained to multiply gradients by minus one to generate input to the previous state estimator.

14. A method comprising:
encoding a spatial and temporal representation of an observed state of an environment;
generating an estimated previous state that estimates a previous state of a given state; and
adjusting a size of a reward based on a difference between the estimated previous state and the previous state, wherein an inaccurate estimation by the previous state estimator (PSE) is an efficient state representation and generates a higher reward than an accurate estimation, wherein the accurate estimation is an inefficient state representation by the previous state estimator (PSE), wherein the size of the reward is adjusted based on $$r_t = r_t^{env} - \xi \delta(s_{t-1}, H_\phi(s_t))$$

where $\mathrm{rt}^{env}$ represents a reward given by an environment at time t, $s_t$ is a state of the environment at the time t, $H\phi$ is a function that is trained to estimate the previous state from the given state, $\delta$ is a general distance function between two state representations, and $\xi$ is a predefined weight, wherein the inefficient state representation incorporates more information than is necessary for determining an action to be performed.

15. A non-transitory computer readable medium comprising computer executable instructions which when executed by a computer cause the computer to perform operations comprising:
encoding a spatial and temporal representation of an observed state of an environment;
generating an estimated previous state that estimates a previous state of a given state; and
adjusting a size of a reward based on a difference between the estimated previous state and the previous state, wherein an inaccurate estimation of the previous state is an efficient state representation and generates a higher reward than an accurate estimation, wherein the accurate estimation is an inefficient state representation of the previous state, wherein the inefficient state representation incorporates more information than is necessary for determining an action to be performed.

16. The non-transitory computer readable medium of claim 15, wherein the operations further comprise reconfiguring a state encoder based on the adjusted reward to reduce an effective size of the spatial and temporal representation.

17. The non-transitory computer readable medium of claim 15, the operations further comprising determining the action based on the spatial and temporal representation.

18. The non-transitory computer readable medium of claim 15, the operations further comprising training a model defining a state encoder using a gradient based optimization algorithm.

19. The non-transitory computer readable medium of claim 15, the operations further comprising training a previous state estimator using a gradient based optimization algorithm.

20. The non-transitory computer readable medium of claim 15, wherein a state encoder is trained to multiply gradients by minus one to generate input to the previous state estimator.

\* \* \* \* \*